United States Patent [19]

Tachita et al.

[11] Patent Number: 5,081,462
[45] Date of Patent: Jan. 14, 1992

[54] METHOD OF DERIVING PHASE OF PSEUDO-RANDOM CODE SIGNAL IN GLOBAL POSITIONING SYSTEM RECEIVER

[75] Inventors: Ryobun Tachita, Kawasaki; Ken Ikeda, Tokyo, both of Japan

[73] Assignee: Matsushita Electric Industrial Co., Ltd., Japan

[21] Appl. No.: 701,273

[22] Filed: May 16, 1991

[30] Foreign Application Priority Data

May 16, 1990 [JP] Japan ................................. 2-127259

[51] Int. Cl.$^5$ ........................................... H04B 7/185
[52] U.S. Cl. ......................................... 342/352; 375/1
[58] Field of Search ....................... 342/352, 353, 356; 375/1

[56] References Cited

U.S. PATENT DOCUMENTS 4,894,662 1/1990 Counselman ...................... 342/357

Primary Examiner—Theodore M. Blum
Attorney, Agent, or Firm—Lowe, Price, LeBlanc & Becker

[57] ABSTRACT

A method, for use in a receiver for the NAVSTAR global positioning system (GPS), of deriving successive values of phase of a received pseudo-random code signal following a momentary interruption of satellite signal reception, with the effects of signal noise eliminated by averaging processing, by first setting a replica pseudo-random code signal to an initial phase value which provides high correlation with the received code signal, and thereafter periodically executing phase derivation operations to obtain the phase of the received code signal, by obtaining the phase difference between the received and replica code signals, obtaining the average value of all of such phase differences obtained up to that point since the initial phase derivation operation, and adding that average value to the sum of a phase value obtained in the first phase derivation operation and a total estimated amount of change of phase of the received code since that first operation. The estimated phase change is obtained based on a corresponding amount of frequency change that has occurred in the carrier of the received signal.

5 Claims, 5 Drawing Sheets

METHOD OF DERIVING PHASE OF PSEUDO-RANDOM CODE SIGNAL IN GLOBAL POSITIONING SYSTEM RECEIVER

BACKGROUND OF THE INVENTION

1. Field of the Invention

The present invention relates to a method of precisely deriving the phase of a received pseudo-random code signal in a receiver apparatus for use with the NAVSTAR satellite global positioning system (hereinafter referred to as GPS). The invention enables derivation of accurate phase values to be quickly resumed, after a temporary interruption of the received signal has disturbed an operation of tracking the received pseudo-random code signal phase.

2. Description of the Prior Art.

In the NAVSTAR GPS navigation satellite system, each satellite transmits a suppressed-carrier L-band radio signal which is phase-modulated by two different pseudo-random code signals, referred to as the P-code (precision code) and the C/A (clear/acquisition) code. Both of these pseudo-random code signals are different between the various satellites of the system, i.e. when received, the codes identify each satellite. Both of the pseudo-random code signals are bi-phase modulated by binary data at a 50 bps rate which conveys various information concerning the satellite. Each code consists of a repetitive sequence of chips (i.e. which can be considered as a unique sequence of +1 and −1 values) which is repeated once every 1023 chips. In the following, for simplicity of description, only one of the pseudo-random code signals from one satellite will be considered. However it will be understood that in general, the operations described will occur concurrently (or by some type of time-sharing multiplexing operation) for signals received from several other satellites. In general, signals from four satellites are received and processed concurrently.

The term "measuring phase" as used herein should be understood as signifying, in the case of a received pseudo-random code signal, measurement of an amount of delay of that signal with respect to reference time points defined by an internal reference timing source (i.e. local clock) of the receiver, which is controlled by an internal reference frequency oscillator, or in the case of a received carrier, signifies a value measured with respect to a reference phase value of a regenerated carrier signal that is produced in the receiver by a regenerated carrier generating circuit. Similarly the term "frequency measurement" signifies measured with respect to the frequency of an output signal from the aforementioned internal reference frequency oscillator.

In a GPS receiver, the binary data conveyed in a received pseudo-random code signal can be demodulated by generating a replica pseudo-random code signal in the receiver, having a code sequence that is identical to that of the received pseudo-random code signal, and multiplying the received code signal by the replica code signal. In the prior art this is usually accomplished by using a carrier tracking loop (i.e. a negative feedback loop which tracks the phase and frequency of the carrier of the received satellite signal) to produce a regenerated carrier, and to use that regenerated carrier to demodulate the received satellite signal (after frequency down-conversion), to obtain the received pseudo-random code signal. A code tracking loop (i.e. a type of negative feedback loop which tracks the phase of the received pseudo-random code signal) receives the received pseudo-random code signal, and produces a replica pseudo-random code signal whose phase closely tracks that of the received code. Thus the code tracking loop provides accurate values of phase of the received pseudo-random code signal.

In addition to the binary data that are conveyed by the bi-phase modulation of the pseudo-random code signal, the received signal from the satellite also contains information relating to the range from the GPS receiver to that satellite, as well as velocity of the receiver. That is to say, the amount of delay of the received signal with respect to the time of transmission from the satellite can be used to derive range information, although since the local clock timing reference of the receiver will generally differ from that of the satellite, that delay information is referred to as pseudo-range information. Such signal delay information can be obtained from the phase of the received pseudo-random code signal, if that is very accurately measured with respect to reference timings which are defined in the receiver.

In addition, the carrier frequency of the received radio signal from the satellite will differ from that of the original transmission frequency, due to Doppler shift resulting from relative motion between the GPS receiver and that particular satellite. Thus since the exact original carrier frequency and the velocity and direction of motion of the satellite can be determined, it is possible to obtain information concerning the velocity as well as the position of a rapidly moving vehicle having a GPS receiver, by precisely measuring the frequency of the received carrier. In practice, it is necessary to combine at least four sets of frequency and delay information, derived simultaneously from signals received from four different satellites, to obtain accurate position and velocity estimates.

If the signal being received from a satellite is momentarily interrupted, then this will usually not be a serious problem with regard to the regenerated carrier even if the interruption lasts for several seconds, since that is usually produced from a highly stable frequency source. Even if there should be some difference in phase or frequency between the received carrier and the regenerated carrier after reception of the satellite signal is restored, it will normally still be possible to use the regenerated carrier to demodulate the received pseudo-random code signal, and frequency and phase pull-in by the carrier tracking loop will rapidly occur automatically thereafter. However if the phase-lock condition of the code tracking loop is lost as a result of such an interruption, then it will be necessary to begin an operation for re-acquiring the lock condition, which will take a substantial time, due basically to the long duration of each code repetition interval (code epoch), and the large value of time constant of the code tracking loop filter. Automatic recovery of phase lock cannot occur in that case, since within each epoch, the code is a random sequence. That is to say, the code tracking loop in a prior art GPS receiver is a negative feedback loop, which functions by periodically detecting the degree of phase correlation difference between the replica pseudo-random code signal and the received pseudo-random code signal, and feeding back a resultant correction amount through a loop filter, to control the phase of the replica pseudo-random code signal. However the phase of the received pseudo-random code signal exhibits substantial random errors due to noise in the received signal, so that it is necessary for the loop filter of the code tracking loop to have a substantially long time constant in order to ensure that the replica pseudo-random code signal will accurately track the true phase of the received pseudo-random code signal. This brings the basic disadvantage that, if the received signal should be momentarily interrupted as described above (i.e. at some time after the signal from the satellite has been initially acquired, and phase tracking of the received carrier and received pseudo-random code signal have stabilized) and the signal is then again received, then in addition to the time required to again re-establish the loop phase-locked condition (i.e. by searching for a phase value which provides maximum correlation between the received and replica codes), a substantial time will be required before the code tracking loop once more become stabilized. During that time, accurate pseudo-range information cannot be derived from the received signal. This is an important disadvantage in the case of a receiver which is to be mounted in a vehicle capable of high values of speed and acceleration, in which maximum continuity of position information is essential.

So long as there is a constant velocity of the GPS receiver vehicle (i.e. relative to the satellite), the received carrier will differ in frequency from the transmitted carrier by a fixed amount, and the phase of the received pseudo-random code signal will change at a fixed rate. However, if the vehicle undergoes rapid changes in acceleration or direction of motion, then these will result in corresponding rapid changes in frequency of the received carrier, and rapid changes in the phase of the received pseudo-random code signal. Thus there is a conflict between providing a code tracking loop which is capable of rapidly responding to changes in phase of the received pseudo-random code signal (i.e. a loop having a relatively wide bandwidth, and so a relatively short time-constant) and so will not lose phase lock as a result of such rapid changes in acceleration, and a code tracking loop which will effectively eliminate the effects of noise in the received signal, to thereby provide a highly accurate measure of the phase of the received pseudo-random code signal, for use in pseudo-range computations (i.e. a loop having a relatively small bandwidth, and so a relatively long time-constant).

That basic problem has not been solved in a simple and effective manner in the prior art, so that it has not been possible to easily and economically produce a GPS receiver which will provide highly accurate measurement of phase of the received pseudo-random code signal, which will quickly resume that accurate phase measurement operation following a temporary interruption of the received signal from a satellite, and which will provide a high speed of response to rapidly occurring changes in motion of vehicle mounting the GPS receiver, to provide accurate values of phase of the received pseudo-random code signal in spite of such motion changes, without danger of loss of code phase tracking capability due to these rapid changes.

SUMMARY OF THE INVENTION

It is therefore an objective of the present invention to overcome the disadvantages of the prior art as set out above, by providing a method of measuring the phase of a received pseudo-random code signal, for use in a global positioning system receiver apparatus, whereby the phase of the received pseudo-random code signal can be rapidly measured to a high degree of accuracy, with accurate phase values being derived after a short time interval following the end of a momentary loss of reception of a satellite signal transmission which conveys that pseudo-random code signal.

It is moreover an objective of the present invention to provide such a method of measuring the phase of a received pseudo-random code signal, whereby a high speed of code tracking response is achieved, so that rapidly occurring changes in phase of the received pseudo-random code signal can be accurately tracked.

To achieve the above objectives, according to a first aspect, the invention provides a method of measuring the phase of a received pseudo-random code signal, for use in a global positioning system receiver apparatus adapted for receiving a radio signal including a received carrier which is modulated by a pseudo-random code signal, the receiver apparatus including means for obtaining a value of frequency of said received carrier, means for demodulating the received carrier to obtain a received pseudo-random code signal, means for generating a replica pseudo-random code signal having a code sequence that is identical to a code sequence of said received pseudo-random code signal, and means for indicating when a predetermined condition of phase correlation occurs between said received pseudo-random code signal and replica pseudo-random code signal, the method comprising, when a momentary interruption of reception of said radio signal occurs, a step of successively varying the phase of said replica pseudo-random code signal until said correlation condition is indicated, and setting the phase of said replica pseudo-random code signal at the phase value for which the correlation condition occurs, then repetitively executing at periodic intervals a phase derivation operation to obtain a current value of phase of said received pseudo-random code signal, the phase derivation operation including steps of:

deriving a cumulative total amount of change of phase ($\Delta\tau(n)$) of said received pseudo-random code signal that has occurred since said correlation condition was indicated, based on an amount of change of frequency of said received carrier, and setting the phase of said replica pseudo-random code signal to a value that is the sum of said initial phase value ($t_1$) and said total amount of phase change ($\Delta\tau(n)$);

measuring an amount of phase difference ($D_n$) between said received pseudo-random code signal and replica pseudo-random code signal;

calculating an average value of a cumulative total of successively derived ones of said amount of phase difference, respectively obtained since said initial value of phase was measured; and calculating the sum of said average value, said initial value of phase ($t_1$) and said total amount of phase change ($\Delta\tau(n)$), to obtain said current value of phase ($t_n$) of said received pseudo-random code signal.

According to a second aspect, the aforementioned step of deriving a cumulative value of phase change of the received pseudo-random code includes deriving an amount of change ($d(n)$) of said pseudo-random code phase that has occurred since an immediately preceding repetition of said phase derivation operation, based on an amount of change of frequency of said received carrier, with that amount of phase change ($d(n)$) being stored in a memory, and the method further comprises a step of judging when a predetermined number of repetitions of said phase derivation operation has been executed, and when that predetermined number is reached, using successive ones of said stored amount of phase change in conjunction with a value of phase of said received pseudo-random code signal that is derived when said predetermined number of repetition is reached, to derive respective recalculated values ($t'_n$) for each of the values of received pseudo-random code signal phase ($t_n$) previously derived up to said predetermined number, According to a third aspect, the method further comprises a step of judging when a predetermined number of repetitions of said phase derivation operation has been executed, and when that predetermined number is reached, setting a finally obtained value of phase ($t_n$) of said received pseudo-random code signal as an initial phase value for a loop filter of a negative feedback type of code tracking loop, and thereafter executing phase tracking of said received pseudo-random code signal by said code tracking loop to thereby obtain successive values of phase of said received pseudo-random code signal.

According to a fourth aspect, the method further comprises a step of judging when a predetermined number of repetitions of said phase derivation operation has been executed, and when that predetermined number is reached, using said stored values of cumulative phase change to derive recalculated values for each of the values of received pseudo-random code signal phase ($t_n$) successively derived in said predetermined number of repetitions, and a step of setting a value of phase of the received pseudo-random code derived when that predetermined number is reached, as an initial phase value for a loop filter of a negative feedback type of code tracking loop, and thereafter executing phase tracking of said received pseudo-random code signal by said code tracking loop to thereby obtain successive values of phase of said received pseudo-random code signal.

DESCRIPTION OF PREFERRED EMBODIMENTS

Figure 1:
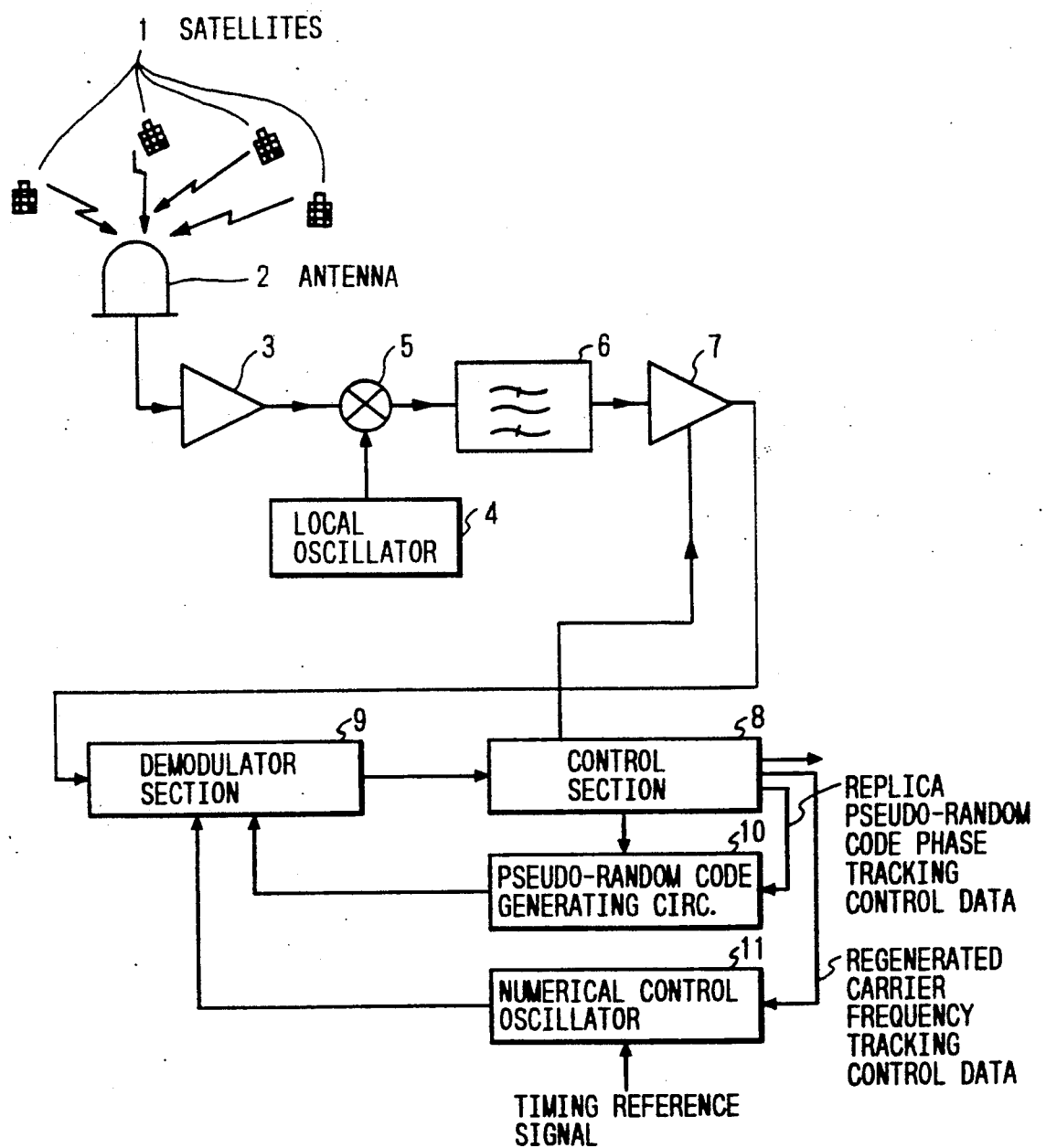
FIG. 1 is a general block diagram of an example of a GPS receiver apparatus to which the method of the present invention is applicable.

Before describing embodiments of the method of the present invention, the basic concepts of the configuration and operation of a typical prior art GPS receiver to which the present invention is applicable will be described, referring to the simple block diagram of FIG. 1. This shows the basic configuration of a GPS receiver which has been proposed by the assignees of the present invention in Japanese Patent Laid-open No. 63-015182. Radio signals from at least four satellites 1, each transmitted with identical carrier frequency and modulated with respectively different pseudo-random code signals, are received by antenna 2, amplified, converted to an intermediate frequency signal by a frequency converter 5 and band pass filter 6, which is amplified and supplied to a demodulator circuit 9. For simplicity of description only the processing concerned with a single pseudo-random code signal corresponding to one satellite will be described in the following. A pseudo-random code signal generating circuit 10 generates a pseudo-random code signal having a code sequence that is identical to that of the pseudo-random code signal of the satellite and whose phase is controlled by the control section 8, and which will be referred to as the replica pseudo-random code signal. An numerical control oscillator 11 produces a regenerated carrier based on the received carrier, which is supplied to the demodulator section 9 for use in demodulating the received signal. The demodulator section 9 demodulates the received pseudo-random code signal, and also derives the phase difference between the regenerated carrier and the received carrier, and the phase difference between the received pseudo-random code signal and the replica pseudo-random code signal, and supplies these values of phase difference to the control section 8. In the prior art, these phase difference values are then processed by transfer through respective loop filters within the control section 8, to obtain respective control signal values that are fed back from the control section 8 to control the pseudo-random code signal generating circuit 10 and numerical control oscillator Il. That is, two negative feedback tracking loops are established for producing a regenerated carrier and a received pseudo-random code signal which track the phase values of the received carrier and the received pseudo-random code signal respectively, i.e. a carrier tracking loop and a code tracking loop. The loop filter of the code tracking loop has a substantially narrower bandwidth than that of the carrier tracking loop, so that the carrier tracking loop exhibits a much more rapid response to a change in frequency of the received carrier than does the code tracking loop to a sudden change in phase of the received pseudo-random code signal. In addition, as described above, the code tracking loop will not automatically pull-in if the phase lock condition is lost, and a substantial time will be required for lock to be re-acquired.

With a GPS receiver utilizing the method of pseudo-random code signal phase measurement according to the present invention, the configuration and basic concepts are similar to those described above, with the only difference being with regard to the code tracking loop. That is to say, with a GPS receiver utilizing the method of the present invention, a demodulator section 9 derives a phase difference between the carrier component of a received frequency-converted signal is supplied thereto for demodulation, and a regenerated carrier that is generated by the numerical control oscillator Il under the control of the control section 8, and the phase difference between the received pseudo-random code signal and a replica pseudo-random code signal that is generated by the pseudo-random code signal generating circuit 10 under the control of the control section 8. However with the method of the present invention, a conventional type of code tracking loop, based on negative feedback and on loop filter processing within the control section 8, is not utilized.

The receiver includes a circuit for detecting when the degree of phase correlation between the received pseudo-random code signal and replica pseudo-random code signal are above a predetermined level, and producing a correlation detection signal indicative of that condition.

Figure 2:
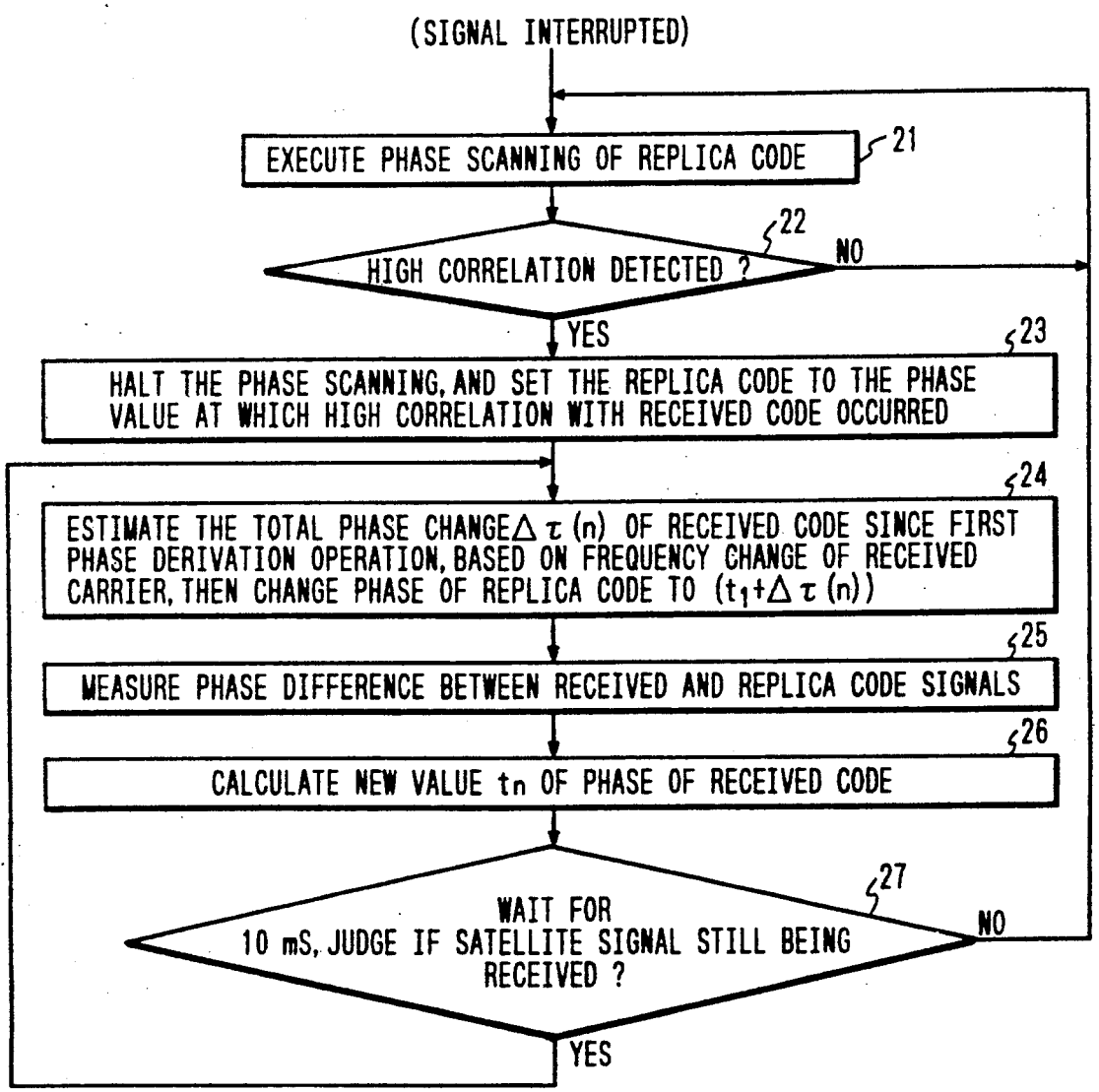
FIG. 2 is a flow diagram of the operation of a first embodiment of the invention.

FIG. 2 is a flow diagram illustrating the control sequence of a first embodiment of the method of the present invention. When any condition has occurred which has resulted in a loss of correlation between the replica pseudo-random code signal and the received pseudo-random code signal, such as an interruption of the received satellite signal, a first step 21 is executed in which the pseudo-random code signal generating circuit 10 is controlled by the control section 8 to execute phase scanning, i.e. to continuously shift the phase of the replica pseudo-random code signal. When it is found in a judgment step 22 that phase correlation is detected between the received and replica codes, and that the degree of correlation is above a predetermined level, then this indicates that that signal from the satellite is once more being received. A step 23 is then executed, in which the phase scanning is halted, then the phase value corresponding to that high degree of correlation is set as the phase of the replica pseudo-random code signal, i.e. the pseudo-random code signal generating circuit 10 is controlled to produce that phase value, by the control section 8.

Thereafter, a loop consisting of a set of steps 24 to 27 is repetitively executed so long as no other interruption of the received signal from the satellite occurs. In the following, each execution of that set of steps, to derive and output a new value of phase of the received pseudo-random code signal, will be referred to as a phase derivation operation. It will be assumed that the phase derivation operations successively occur at intervals of 10 milliseconds. First, in step 24, the phase of the replica pseudo-random code signal from the pseudo-random code signal generating circuit 10 is updated (as described in detail hereinafter), using an estimated amount of phase shift of the received pseudo-random code signal that is based on a measured amount of phase shift of the received carrier. Next, in step 25 of the loop, the current value of phase difference between the replica pseudo-random code signal and the received pseudo-random code signal is derived by the demodulator section 9 and supplied to the control section 8. Next, in step 26, the current phase value of the received pseudo-random code signal is calculated (as described in detail hereinafter), based on:

(a) the initial value of phase of the received pseudo-random code signal that was obtained in the first phase derivation operation after signal recovery;

(b) an estimated cumulative amount of phase shift of the received carrier that has occurred since that initial phase value was set, and (c) the average value of all of the amounts of phase difference that have been derived in step 25 (in successive phase derivation operations) since that initial phase value was set.

Operation then enters a wait interval of 10 seconds, then a check is then made, in step 27, to determine whether the satellite signal is still being received. That decision is based upon whether the amplitude of the demodulated pseudo-random code signal is above a predetermined level. If the signal is still being received, operation returns to step 24 and the above sequence of steps 24 to 27 is repeated to obtain a new value of received pseudo-random code signal phase.

If during any phase derivation operation it is found in step 27 that the signal from the satellite is no longer being detected, then operation returns to step 21. Phase scanning of the replica pseudo-random code signal is resumed, and when satisfactory phase correlation between the replica pseudo-random code signal and received pseudo-random code signal is detected, then as described hereinabove the phase of the replica pseudo-random code signal produced from the pseudo-random code signal generating circuit 10 is set accordingly. Repetitive phase derivation operations by the executions of the loop of steps 24 to 26 is then resumed.

Figure 3A:
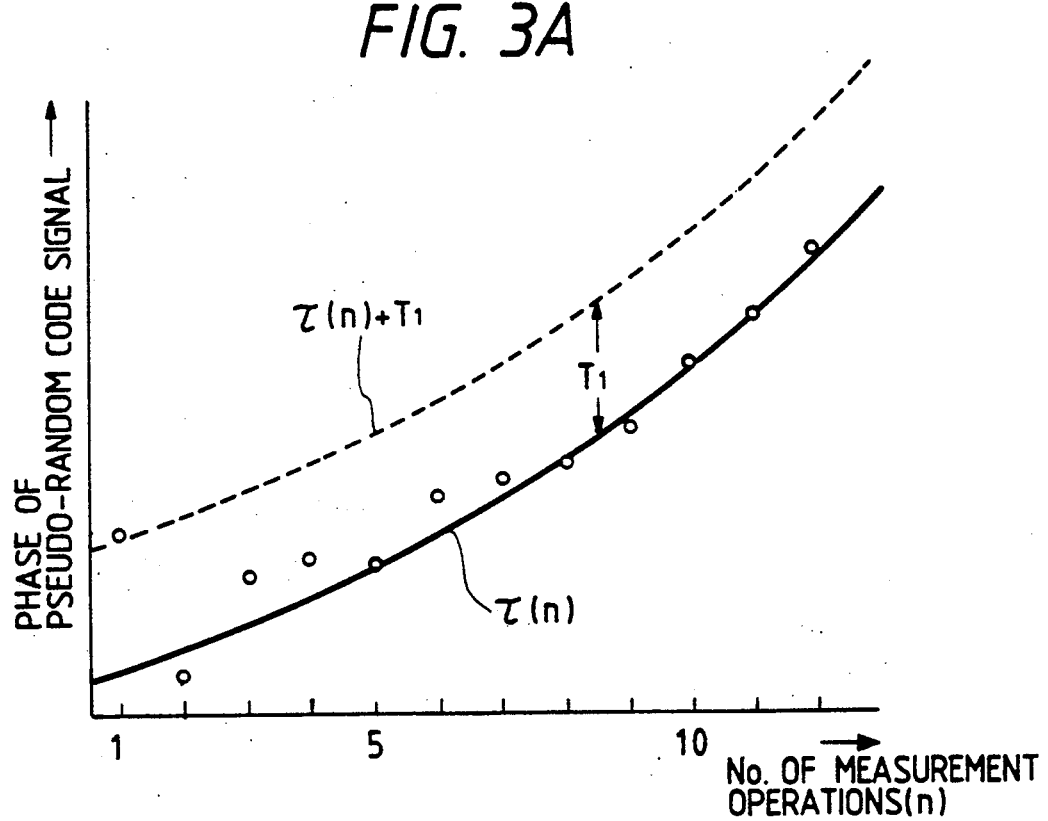
FIGS. 3A and 3B are graphs for illustrating the operation of the first embodiment.
Figure 3B:
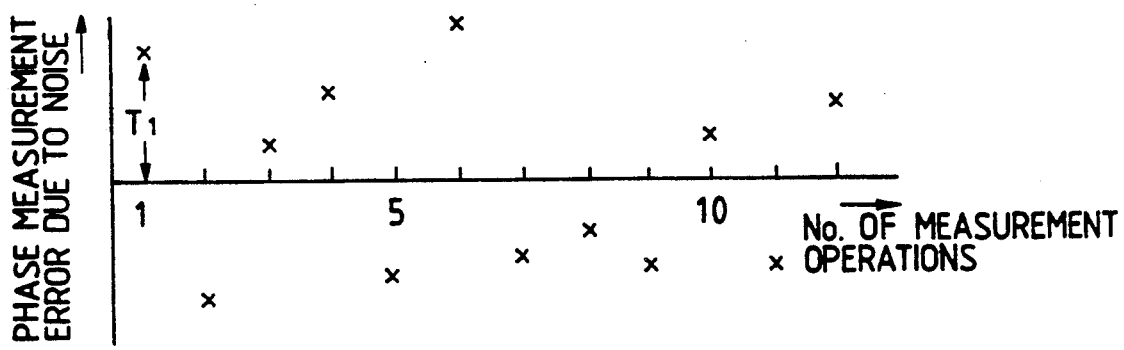

The above operating sequence will be described in greater detail referring to FIGS. 3A and 3B. In FIG. 3A, values of phase are plotted along the vertical axis and cumulative numbers of phase derivation operations (where "phase derivation operation" has the significance defined hereinabove) are plotted along the horizontal axis, with the current phase derivation operation being designated as the $n^{th}$ operation and with the subscript n indicating a measured value or calculated result in the $n^{th}$ phase derivation operation. In FIG. 3B, values of error in measuring phase difference between the received pseudo-random code signal and replica pseudo-random code signal by the demodulator section 9 are plotted along the vertical axis, and cumulative numbers of phase derivation operations are plotted along the horizontal axis.

In FIG. 3A, the full-line curve represent changes in the actual phase of the received pseudo-random code signal, where "actual phase" signifies the phase that would be measured if the received signal from that satellite were noise-free, i.e. if there were no phase jitter in the demodulated received pseudo-random code signal that is derived in the demodulator section 9. In practice of course, there will be a substantial amount of phase jitter due to thermal noise effects etc. In a prior art (negative feedback) code tracking loop, the effects of that noise are reduced by the action of the loop filter. The value of that actual phase of the received pseudo-random code signal at the $n^{th}$ phase derivation operation is designated as $\tau(n)$. The "o" symbols in FIG. 3A indicate respective values of calculated phase that are derived and outputted in step 26 of FIG. 2, and the value of that phase which is derived in the $n^{th}$ phase derivation operation is designated as $t_n$. The broken-line curve represents the phase of the replica pseudo-random code signal that is produced from the pseudo-random code signal generating circuit 10.

In FIG. 3B, the "x" symbols indicate respective values of error in measuring the phase difference between the replica pseudo-random code signal and received pseudo-random code signal by the demodulator section 9, which result from the aforementioned phase jitter that is caused by noise in the received signal. The value of that error in the $n^{th}$ phase derivation operation is designated as Tn. In this embodiment, the phase derivation operations are repeated at intervals of 10 milliseconds.

When the loop of steps 25 to 26 is first entered from step 23 in FIG. 2, the pseudo-random code signal generating circuit 10 is at that time controlled by the control section 8 such that the phase of the replica pseudo-random code signal is very close to that of the received code, since that phase provides very close correlation between the received and replica code signals. However an initial phase value $t_1$ that will then be outputted in step 26 will be in error to some extent, relative to the actual phase of the received pseudo-random code signal, due to the effects of noise on the phase difference measurement operation of step 25. That error amount being indicated as $T_1$ in FIG. 3A. The actual phase of the received code signal at that time will be designated as $\tau(1)$. That is, $$t_1 = \tau(1) + T_1$$

When the sequence of steps 24 to 26 is then again executed, after a 10 mS interval, the amount of change of phase of the received pseudo-random code signal that has occurred since the first phase value $t_1$ was derived is calculated, based on a measured amount of change of frequency of the received carrier that has occurred during that first 10 mS interval. That amount of change will be designated as $\Delta\tau(2)$, since this will be considered as the second phase derivation operation. The phase of the replica pseudo-random code signal is then set to the value $t_1 + \Delta\tau(2)$. The phase difference between the received pseudo-random code signal and replica pseudo-random code signal is then measured in step 25, then a computed value $t_2$ for the phase of the received pseudo-random code signal is derived in step 26. The above operations 28 to 24 are then repeated, as a third phase derivation operation, and so on.

Thereafter, the sequence of steps 24 to 26 is repetitively executed at 10 millisecond intervals, as successive phase derivation operations. In each execution, in step 24, a calculation is made (based on a cumulative total of amounts of frequency change of the received carrier that have occurred in each of the preceding 10 mS intervals) to obtain the total amount of phase shift ($\Delta\tau(n)$) of the received pseudo-random code signal that has occurred from the time at which the initial phase value $t_1$ was derived. That carrier frequency change information is obtained from the carrier tracking loop whereby the control section 8 controls the numerical control oscillator 11. In practice, an amount of phase shift of the received pseudo-random code signal occurring over a specific time interval can be accurately estimated from the amount of change in frequency of the receive carrier that has occurred over the same time interval, and that process of deriving estimated amounts of phase shift is a basic feature of the method of the present invention.

More specifically in the $n^{th}$ phase derivation operation, an amount of frequency change of the received carrier that has occurred since the last execution of step 26 is measured, a corresponding amount of phase shift of the received pseudo-random code signal is then estimated from that amount of carrier frequency shift, in step 24, then that estimated amount is added to a cumulative total amount of phase shift $\Delta\tau(n-1)$ that was derived in the $(n-1)^{th}$ phase derivation operation, to thereby obtain the cumulative phase shift amount $\Delta\tau(n)$ for the $n^{th}$ phase derivation operation.

The control section 8 then controls the pseudo-random code signal generating circuit 10 to set the phase of the local pseudo-random code signal to a value that is the sum of the initially derived phase $t_1$ and that accumulated total amount of estimated phase shift (n) of the received pseudo-random code signal that has occurred since the initial phase value $t_1$ was obtained.

It can thus be understood that these successive values $t_1 + \Delta\tau(n)$ established for the local pseudo-random code signal will follow the broken-line curve shown in FIG. 3A, i.e. that these values will be fixidly offset from the actual phase of the received pseudo-random code signal (shown as the full-line curve) by the initial amount of phase measurement error $T_1$. It can moreover be understood that each value of phase difference between the received and local pseudo-random code signals that is obtained in step 25 can be expressed as $(T_n - T_1)$ where $T_n$ is the amount of error in the current phase measurement operation, i.e. that each value of phase difference obtained in step 25 is actually the difference between the initial amount of phase measurement error $T_1$ and the amount of phase measurement error (due to noise) that occurred in the current execution of step 25.

In step 26, the actual value of the received pseudo-random code signal is calculated using the following equation (1), designating $t_n$ as the value obtained in step 26 of the $n^{th}$ phase derivation operation. In the equation, $D_m$ designates the value of phase difference between the received and replica pseudo-random code signals in the $m_{th}$ phase derivation operation, which as described hereinabove must be equal to the difference between the measurement error due to noise, when that phase difference was measured, and the measurement error $T_1$ contained in the initial phase value $t_1$.

$$\begin{aligned} t_n &= \left\{ \sum_{m=1}^{n} (D_m) \right\} \div n + t1 + \Delta\tau(n) \\ &= \left\{ \sum_{m=1}^{n} (Tm - T1) \right\} \div n + t1 + \Delta\tau(n) \\ &= \left( \sum_{m=1}^{n} Tm - nT1 \right) \div n + \tau(1) + T1 + \Delta\tau(n) \\ &= \left( \sum_{m=1}^{n} Tm \div n + \tau(1) + \Delta\tau(n) \right) \end{aligned} \quad (1)$$

The term $$\left\{ \sum_{m=1}^{n} (Tm - T1) \right\}$$

in the above is the sum of all of the phase difference values obtained in the preceding executions of step 25, and the operation in step 26 is equivalent to deriving the sum of:

(a) the average value of phase difference measurement error up to the $n^{th}$ phase derivation operation (which, since it consist of random positive and negative values resulting from the effects of noise, will be close to zero if n is sufficiently large), (b) the actual phase ($\tau(1)$) of the received pseudo-random code signal at the time of the first phase derivation operation, and (c) the total amount of phase shift ($\Delta\tau(n)$) of the received pseudo-random code signal up to the $n^{th}$ phase derivation operation, which has been derived based on an accumulation of successive measured amounts of frequency change of the received carrier.

Hence, when n becomes sufficiently large, these calculated values $t_n$ will conform substantially accurately to the actual phase of the received pseudo-random code signal, i.e. will conform closely to the full-line curve of FIG. 3.

Changes in frequency of the received carrier can be measured much more accurately then phase changes of the received pseudo-random code signal, and since there is a known relationship between changes in received carrier frequency and phase of the received pseudo-random code signal, the method of the present invention accurately derives successive values of the received code phase based upon successive amounts of change in carrier frequency. Moreover as described hereinabove, the carrier tracking loop has a much higher speed of response (i.e. to sudden changes in the received signal resulting from rapid variations of acceleration of the GPS receiver) than does a code tracking loop used for negative feedback control of the phase of a replica pseudo-random code signal, in a prior art GPS receiver. Thus the method of the present invention enables the GPS receiver to operate more effectively than a prior art receiver, when rapid changes occur in the phase of the received pseudo-random code signal as a result of changes in the direction of high-velocity motion, or due to rapidly varying changes in acceleration, of a vehicle in which the receiver is mounted.

The method of FIG. 2 can be summarized as:

After satellite signal reception is restored, detecting an initial value of phase of the replica pseudo-random code signal, which provides a high degree of correlation with the received pseudo-random code signal, and leaving the replica pseudo-random code signal set at that phase; then cyclically executing a sequence of phase derivation operations each consisting of:

(a) Obtaining a cumulative total amount of phase change of the received pseudo-random code signal since the aforementioned initial value was obtained, based on an amount of carrier frequency change that has occurred, then set the phase of the replica pseudo-random code signal to a value that is the sum of the initial phase value ($t_1$) and the cumulative phase change amount ($\tau(n)$).

(b) Measure the phase difference between the received pseudo-random code signal and the replica pseudo-random code signal;

(c) Derive the average of all of the amounts of phase difference that have been measured so far, and add that average value to the initial phase value and the cumulative phase change amount, to thereby obtain the current phase value of the received pseudo-random code signal.

It can be understood from the above that, as is the case with a prior art negative feedback tracking loop in which loop filter processing is executed, the present invention enables the actual phase of a received signal to be accurately tracked in spite of random fluctuations in apparent phase of that received signal due to noise. However that effect is not achieved by the use of a narrow-bandwidth loop filter in a negative-feedback loop, but instead by deriving successive phase values in which, after a relatively small number of phase derivation operations have been successively executed, the effects of the phase measurement errors due to noise are averaged out and are thereby substantially eliminated. Since as illustrated in FIG. 3, the values that are derived for the phase of the received pseudo-random code signal will rapidly begin to track the actual phase of the received pseudo-random code signal after a short time following restoration of the received satellite signal after an interruption, much more rapid recovery of phase tracking and of generating accurate values of pseudo-range will be achieved than is possible with a prior art type of code tracking loop which is based on negative feedback employing a loop filter.

It will further be understood that this method is based upon accurately estimating cumulative amounts of change in phase of a received pseudo-random code signal, based upon corresponding cumulative amounts of change of frequency of a received carrier from which that received pseudo-random code signal is derived by demodulation. Thus accurate code phase tracking can be maintained in spite of sudden changes in phase of the received pseudo-random code signal which result from changes in direction or acceleration of vehicle carrying the GPS receiver, since values of change of phase or frequency of the received carrier are obtained from the carrier tracking loop, which has an inherently higher speed of response than a conventional type of code tracking loop.

Although in the embodiment described above it has been assumed that a negative feedback type of carrier tracking loop is utilized to control the numerical control oscillator I1, typically having a time constant of approximately a few hundred milliseconds, the invention is equally applicable to other methods of measuring and controlling the phase and frequency of the regenerated carrier.

Furthermore, although in the above embodiment it is assumed that successive phase derivation operations occur at 10 millisecond intervals, it would be equally possible to use some other value for that repetition interval, in accordance with a specific GPS application.

Also, although in the above it has been assumed that each execution of step 25 is followed by execution of step 26, it may be preferable to successively execute the steps 24 and 25 a plurality of times within each of the intervals between execution of step 26. That is to say, steps 24 and 26 would be repetitively executed as a sub-loop within the loop of steps 24 to 27, but with successive new phase values $t_n$ still being derived at 10 mS intervals. In that case, before executing step 26, the average of the amounts of measured phase difference between the received and replica pseudo-random code signals in the last 10 mS interval would be computed immediately before each execution of step 26, so that each value ($T_m - T_1$) used in the equation (1) would be an average value of phase difference for the preceding 10 mS interval.

Furthermore, although in the above description it is assumed that there is a 10 millisecond "wait" interval between steps 26 and 24, it would be possible to modify the embodiment to insert that interval between some other two successive steps of the loop of steps 24 to 26.

It should also be noted that it would be equally possible to control the pseudo-random code signal generating circuit 10 to set quantized values of phase for the local pseudo-random code signal, and also to subtract quantized values of phase to measure the phase difference, in step 25.

Figure 4:
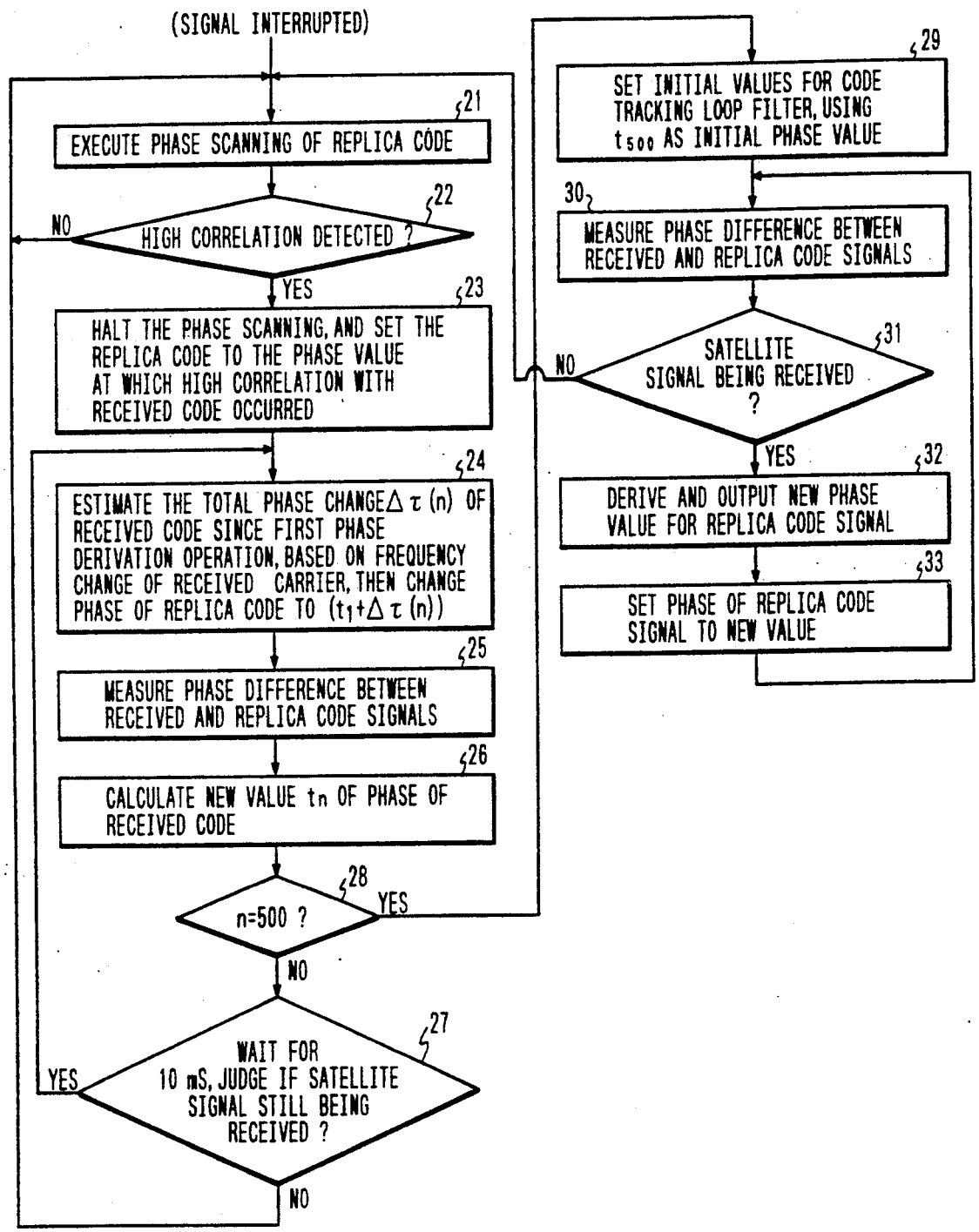
FIGS. 4 and 5 are flow diagrams for a second and a third embodiment of the invention respectively.

A second embodiment of the method of the present invention will be described referring to FIG. 4. This method is basically similar to the first embodiment, and is also applicable to a GPS receiver having a basic configuration such as that shown in FIG. 1. Only the points of difference between this embodiment and the first embodiment will be described in detail. FIG. 4 shows the control sequence of this embodiment. Firstly, as for the first embodiment, sweeping of the phase of the replica pseudo-random code signal that is executed in step 21 is halted when the satellite signal begins to be received again after having been interrupted, i.e. when a sufficient degree of phase correlation between the received and replica pseudo-random code signals is detected, and an initial value of phase of the received pseudo-random code signal is set. Thereafter the series of steps 25 to 28 are repetitively executed, to periodically derive estimated values of the actual phase of the received pseudo-random code signal, i.e. step 24 to update the phase of the local pseudo-random code signal from the pseudo-random code signal generating circuit 10, step 25 to measure the phase difference between the received and locally generated pseudo-random code signals, step 26 to calculate the current phase of the received pseudo-random code signal, and step 27 to wait for 10 mS and then check that the satellite signal is still being received.

However with the second embodiment, a judgement step 28 is inserted following step 26, to determine whether a sufficient number of phase derivation operations has been executed to ensure that accurate values of phase of the received pseudo-random code signal are now being produced. That is to say, after the number of phase derivation operations n reaches a specific value which will be assumed here to be 500, operation moves to a step 29 after step 28, whereas if that number 500 has not yet been reached, operation moves to step 27 and another phase derivation operation is executed thereafter. Thus in this example the operation moves to step 29 after a time of 0.5 second has elapsed since the point at which reception of the satellite signal was restored.

In step 29, initial values are set for a conventional type of (negative feedback) code phase tracking loop, which utilizes loop filter processing of values of phase difference between the received pseudo-random code signal and replica pseudo-random code signal, to obtain a phase control signal for controlling the pseudo-random code signal generating circuit 10. Next, in step 30, the phase difference between the received pseudo-random code signal and replica pseudo-random code signal is measured, and in step 31 a check is made as to whether the satellite signal is still being received, based on detecting the amplitude of the demodulated pseudo-random code signal. In step 32, a measured value of phase of the received pseudo-random code signal is derived and outputted, and in step 33, the pseudo-random code signal generating circuit 10 is controlled to update the phase of the replica pseudo-random code signal in accordance with an output value from the loop filter of the code tracking loop. Operation then returns to step 30.

It can thus be understood that with this embodiment, when it is judged in step 28 that a sufficient degree of accuracy has been reached for the estimated phase of the received pseudo-random code signal in step 26, i.e. a sufficiently large value of the number of repetitions n has been reached, operation is changed to that of a conventional type of negative feedback code tracking loop for controlling the phase of the replica pseudo-random code signal.

With regard to the initial values that are set in step 29, these include the initial phase value that will be established for the replica pseudo-random code signal by the code tracking loop, which is set as the latest output value that was obtained in step 26, i.e. the value $t_{500}$ which was obtained in the $500^{th}$ execution of step 26, while the velocity and acceleration parameters etc. are each set to zero.

Next, in step 30, the phase difference between the received pseudo-random code signal and replica pseudo-random code signal is measured by the demodulator section 9, and after checking that the satellite signal is still being received, that value of phase difference is inputted to the tracking loop filter in the control section 8. Such a filter must inherently have a long time constant, of approximately 5 seconds. Thus, although not indicated in FIG. 4, it is preferable with this embodiment to also perform calculations for estimating the values of high frequency components of variation of phase of the received pseudo-random code signal, based upon variations in phase and frequency of the received carrier. In that case, each time that step 32 is executed, an estimated value of these high-frequency components is combined with an output value of phase produced from the tracking loop filter, to obtain a final output value of phase from the control section 8, to which the replica pseudo-random code signal is then set.

Operation then returns to step 30, and steps 30 to 33 are then repeated.

With the method of the first embodiment, as the number of successive phase derivation operations increases, after reception of a satellite signal has been restored, the accuracy required to execute the calculations of step 26 will increase accordingly, i.e. due to the increasing magnitudes of cumulative values. However after a certain number of phase derivation operation repetitions, there will be no significant increase in accuracy of the output values of received pseudo-random code signal phase that are obtained in step 26. With the method of the second embodiment therefore, after a sufficiently high degree of accuracy of deriving values of received pseudo-random code signal phase has been reached by successive executions of steps 24 to 26 a specific number of times, operation is changed to that of a conventional negative feedback tracking loop, for obtaining the value of phase of the received pseudo-random code signal and for holding the phase of the replica pseudo-random code signal locked to that of the received pseudo-random code signal. In this way, maximum accuracy of measurement of the received pseudo-random code signal phase can be very rapidly achieved after a temporary interruption of reception of the satellite signal, without problems arising due to execution of an excessively large number of repetitions of calculations in accordance with equation (1) given hereinabove.

A third embodiment of the method of the present invention will be described referring to FIG. 5. This embodiment will be described as a modification of the second embodiment, but could equally well be implemented as a modification of the first embodiment, and is applicable to a GPS receiver having a basic configuration such as that shown in FIG. 1. Only the points of difference between this embodiment and the first and second embodiments will be described in detail. In certain applications, in addition to a requirement for an accurate current value of phase representing propogation delay of the received satellite signal, it is also necessary to have an accurate "past history" of changes in that phase, for use in determining amounts and direction of changes in position of the vehicle mounting the GPS receiver. As shown in FIG. 3A, there is a short initial period following restoration of signal reception, in which the derived phase values $t_n$ obtained by the first or second methods of the present invention differ significantly from the true phase of the received pseudo-random code signal by randomly varying amounts. With the third embodiment therefore, once the derived phase values $t_n$ reach a sufficient degree of accuracy, the set of phase values that were derived up to that time (extending from the initial value $t_1$ after signal recovery) are recalculated, using in that recalculation a final accurately derived phase value (which will be assumed in the following to be that obtained in the $500^{th}$ phase derivation operation, i.e. $t_{500}$) and the respective values of cumulative phase change ($\Delta\tau(n)$). It is therefore necessary to store each of these successively obtained cumulative phase change $\Delta\tau(n)$ values, for subsequent use in the recalculation process.

The basis for the recalculation operation is as follows. As can be understood from equation (1) above, $$t_{500} = \left(\sum_{m=1}^{500} T_m \div 500\right) + \tau(1) + \Delta\tau(500)$$

Thus, each accurate recalculated value $t'_n$ is obtained as:

$$\begin{aligned} t'_n &= \left(\sum_{m=1}^{500} T_m \div 500\right) + \tau(1) + \Delta\tau(n) \\ &= t_{500} - \Delta\tau(500) + \Delta\tau(n) \end{aligned} \quad (2)$$

Figure 5:
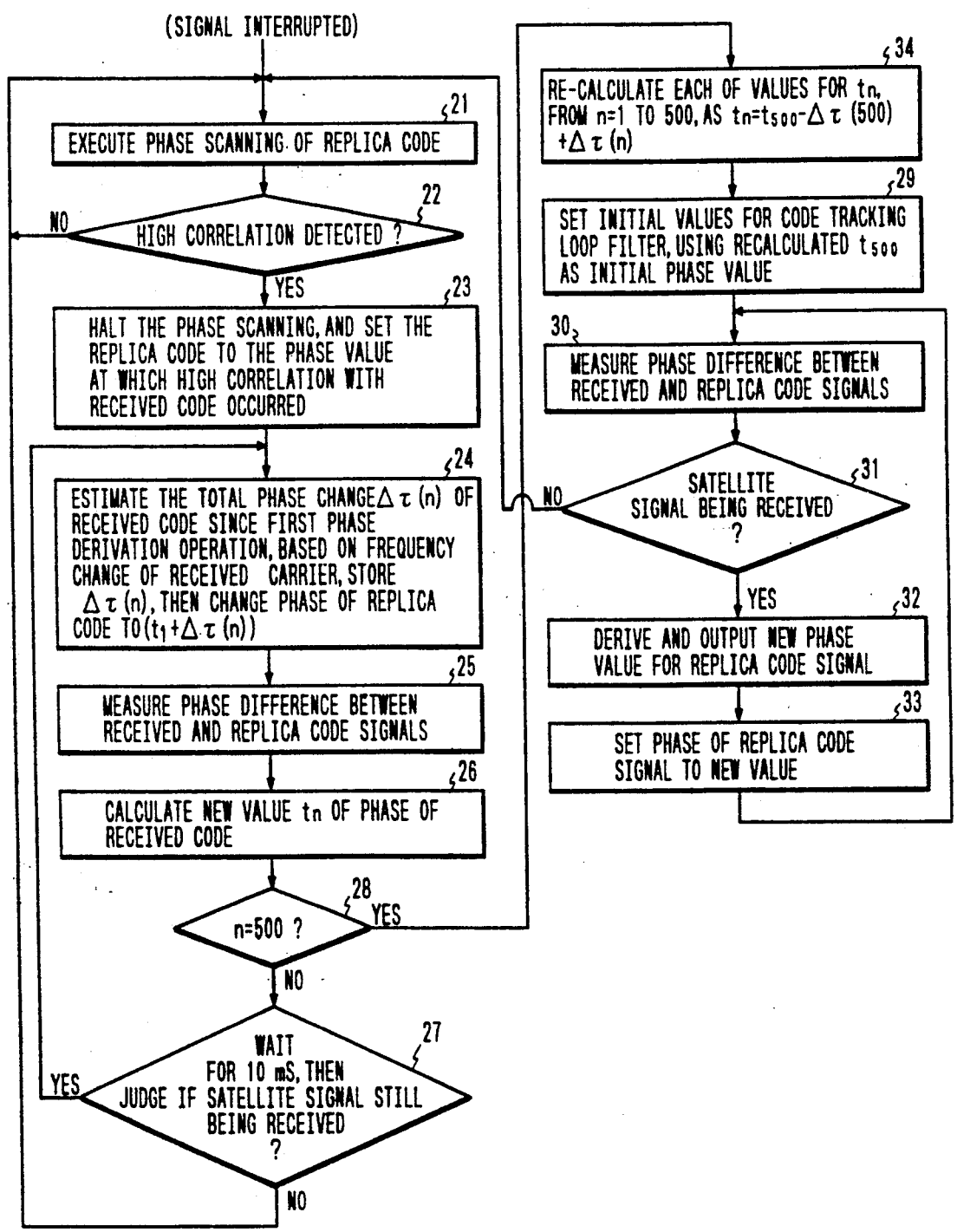

FIG. 5 shows the control sequence of this embodiment. Firstly, as for the first embodiment, phase sweeping of the replica pseudo-random code signal that is executed in step 21 is halted when the satellite signal begins to be received again after having been interrupted, and an initial value of phase of the received pseudo-random code signal is measured and is set for the pseudo-random code signal generating circuit 10. Thereafter the series of steps 24 to 26 are repetitively executed, to periodically derive estimated values of the actual phase of the received pseudo-random code signal in successive executions of step 26.

However with the third embodiment, each time a new value $\Delta\tau(n)$ is derived (in step 24) for the cumulative amount of phase shift of the received pseudo-random code signal that has occurred since the initial phase value $(t_1)$ was derived, that new value of cumulative phase shift is stored as a data value in memory.

Also, as for the second embodiment described above, repetitive execution of the loop of steps 27 to 26 is terminated when a sufficiently large number of repetitions (in this example, 500) has been reached. When it is found in a judgement step 28 that the number of phase derivation operations has reached 500, operation then moves to a step 34. In step 34, starting from the initial phase value $t_1$, successive values of recalculated phase of the received pseudo-random code signal $t'_n$ are computed by equation (2) above, using the successive values of cumulative phase change (n) that have been stored in memory in step 24 and the phase value $t_{500}$ derived in the 500$^{th}$ execution of step 26.

Next in step 29, as for the second embodiment described hereinabove, initial values are set for a conventional type of negative feedback code phase tracking loop, and the subsequent processing steps 30 to 33 are identical to that of the second embodiment.

Thus with the third embodiment, more accurate averaging of the effects of noise can be achieved, as a result of the re-calculation operation executed to obtain a final value of received pseudo-random code signal phase, and hence a more accurate "past history" of changes in the phase of the received code signal from the point at which signal recovery occurred, can be obtained.

In the above it is assumed that a value of cumulative phase change $\Delta\tau(n)$, derived based on a change in received carrier frequency, is stored during each execution of the sequence of steps 24 to 27. However it may be preferable to store such values of phase change at intervals of a fixed number of phase derivation operations, e.g. to store a new value once in every second phase derivation operation, or once in every fourth phase derivation operation, depending upon the accuracy that is required for the recalculated "past history" of phase of the received code signal.

Furthermore it is assumed in the above that the recalculation step 34 is inserted into a series of operating steps, e.g. within a sequence of processing operations controlled for example by a serial-operation digital processor. However in some cases it may be possible to execute the recalculation processing concurrently with execution of current phase derivation operations.

Obviously the first embodiment could be adapted to the above recalculation operation, by inserting the judgement step 28 after step 26 in FIG. 2, and beginning the recalculation processing when a "yes" outcome is reached.

In the above, it has been assumed that successive recalculated values $t'_n$ are obtained beginning from the initially derived phase value $t_1$ and extending up to the 499$^{th}$ phase value. However it would be equally possible to execute the recalculation process in the reverse direction, i.e. operating on the derived phase value $t_{499}$ to obtain a recalculated value $t'_{499}$ and so on back to $t_1$.

A fourth embodiment will be described, which can be implemented as a modification of the first embodiment described above, but which could be applied in principle to any of the three embodiments. With the first embodiment, each updated value obtained in step 24 is obtained by adding $\Delta\tau(n)$ to $(\tau(1)+T_1)$ so that the replica pseudo-random code signal is held fixedly different from the actual phase of the received pseudo-random code signal by a small amount of initial measurement error $T_1$, i.e. the successive values to which the replica code signal is set will follow the broken-line curve in FIG. 3A. However as will be clear from FIG. 3A, the values of phase $t_n$ that are derived in step 26 of the first embodiment will rapidly become close to the actual phase values of the received pseudo-random code, indicated by the full-line curve. With the fourth embodiment therefore, after a sufficient number of executions of step 26 has been performed to ensure sufficient accuracy for the values that are successively derived in that step, the operation is changed such that each new value of phase to which the replica pseudo-random code is set is obtained by adding to the immediately precedingly derived phase value $t_{n-1}$ the amount of phase change of the received pseudo-random code signal that is estimated to have occurred since that preceding value was derived, i.e. the amount of phase change that has occurred in the preceding 10 mS interval as calculated from the amount of measured frequency change that has occurred for the received carrier during that 10 mS interval In that case the phase of the replica pseudo-random code signal will become the successive values of t(n) shown in FIG. 3, indicated by the "o" symbols, rather than following the broken-line curve of values $(t_1+\Delta\tau(n))$. In that way it becomes unnecessary to devote processing time to compute values in accordance with equation (1) above, after a sufficient degree of accuracy has been achieved. Thus the fourth embodiment differs from the first embodiment of FIG. 2 by having the following additional steps:

(a) A judgement step following a "yes" outcome in step 27, to judge whether a predetermined number of pmos has been reached. If the number has not been reached, operation returns to step 24.

(b) A calculation step executed after a "yes" outcome in that judgement step, in which an estimated amount of change of phase d(n) of the received code signal since the preceding value of phase of that code signal was computed, based on a measured amount of frequency change of the received carrier during the preceding 10 mS interval, and in which that estimated amount of phase change d(n) is added to the last value ($t_{n-1}$) of phase that was derived for the received pseudo-random code signal; and (c) A step of waiting for 10 mS, then judging if the satellite signal is still being received, and if so, returning to the calculation step (b), while otherwise, retuning to step 21.

If such a modification is applied to the third embodiment, then it will be necessary to use for the recalculation operations only the set of consecutively derived phase values extending up to the point at which changeover was executed to the operation of steps (b), (c) above, i.e. up to the point when the phase of the replica pseudo-random code signal ceased to follow the broken-line curve shown in FIG. 3A.

What is claimed is:

1. A method of measuring the phase of a received pseudo-random code signal, for use in a global positioning system receiver apparatus adapted for receiving a radio signal including a received carrier which is modulated by a pseudo-random code signal, the receiver apparatus including means for obtaining a value of frequency of said received carrier, means for demodulating the received carrier to obtain a received pseudo-random code signal, means for generating a replica pseudo-random code signal having a code sequence that is identical to a code sequence of said received pseudo-random code signal, and means for indicating when a predetermined condition of phase correlation occurs between said received pseudo-random code signal and replica pseudo-random code signal, the method comprising, when a momentary interruption of reception of said radio signal occurs, a step of successively varying the phase of said replica pseudo-random code signal until said correlation condition is indicated, and setting the phase of said replica pseudo-random code signal at the phase value for which the correlation condition occurs, then repetitively executing at periodic intervals a phase derivation operation to obtain a current value of phase of said received pseudo-random code signal, the phase derivation operation including steps of:

deriving a cumulative total amount of change of phase ($\Delta\tau(n)$) of said received pseudo-random code signal that has occurred since said correlation condition was indicated, based on an amount of change of frequency of said received carrier, and setting the phase of said replica pseudo-random code signal to a value that is the sum of said initial phase value ($t_1$) and said total amount of phase change ($\Delta\tau(n)$);

measuring an amount of phase difference ($D_n$) between said received pseudo-random code signal and replica pseudo-random code signal;

calculating an average value of a cumulative total of successively derived ones of said amount of phase difference, respectively obtained since said initial value of phase was measured; and calculating the sum of said average value, said initial value of phase ($t_1$) and said total amount of phase change ($\Delta\tau(n)$), to obtain said current value of phase ($t_n$) of said received pseudo-random code signal.

2. The method according to claim 2, and in which said step of deriving a cumulative value of phase change of the received pseudo-random code includes deriving an amount of change (d(n)) of said pseudo-random code phase that has occurred since an immediately preceding repetition of said phase derivation operation, based on an amount of change of frequency of said received carrier, and storing said amount of phase change (d(n)) in a memory, the method further comprising a step of judging when a predetermined number of repetitions of said phase derivation operation has been executed, and when that predetermined number is reached, using successive ones of said stored amount of phase change in conjunction with a value of phase of said received pseudo-random code signal that is derived when said predetermined number of repetition is reached, to derive respective recalculated values ($t'_n$) for each of the values of received pseudo-random code signal phase ($t_n$) previously derived up to said predetermined number, 3. A method of measuring the phase of a received pseudo-random code signal, for use in a global positioning system receiver apparatus adapted for receiving a radio signal including a received carrier which is modulated by a pseudo-random code signal, the receiver apparatus including means for obtaining a value of frequency of said received carrier, means for demodulating the received carrier to obtain a received pseudo-random code signal, means for generating a replica pseudo-random code signal having a code sequence that is identical to a code sequence of said received pseudo-random code signal, and means for indicating when a predetermined condition of phase correlation occurs between said received pseudo-random code signal and replica pseudo-random code signal, the method comprising, when a momentary interruption of reception of said radio signal occurs, a step of successively varying the phase of said replica pseudo-random code signal until said correlation condition is indicated, and setting the phase of said replica pseudo-random code signal at the phase value for which the correlation condition occurs, then repetitively executing at periodic intervals a phase derivation operation to obtain a current value of phase of said received pseudo-random code signal, the phase derivation operation including steps of:

deriving a cumulative total amount of change of phase ($\Delta\tau(n)$) of said received pseudo-random code signal that has occurred since said correlation condition was indicated, based on an amount of change of frequency of said received carrier, and setting the phase of said replica pseudo-random code signal to a value that is the sum of said initial phase value ($t_1$) and said total amount of phase change ($\Delta\tau(n)$);

measuring an amount of phase difference ($D_n$) between said received pseudo-random code signal and replica pseudo-random code signal;

calculating an average value of a cumulative total of successively derived ones of said amount of phase difference, respectively obtained since said initial value of phase was measured; and calculating the sum of said average value, said initial value of phase ($t_1$) and said total amount of phase change ($\Delta\tau(n)$), to obtain said current value of phase ($t_n$) of said received pseudo-random code signal;

the method further comprising a step of judging when a predetermined number of repetitions of said phase derivation operation has been executed, and when that predetermined number is reached, setting a finally obtained value of phase ($t_n$) of said received pseudo-random code signal as an initial phase value for a loop filter of a negative feedback type of code tracking loop, and thereafter executing phase tracking of said received pseudo-random code signal by said code tracking loop to thereby obtain successive values of phase of said received pseudo-random code signal.

4. A method of measuring the phase of a received pseudo-random code signal, for use in a global positioning system receiver apparatus adapted for receiving a radio signal including a received carrier which is modulated by a pseudo-random code signal, the receiver apparatus including means for obtaining a value of frequency of said received carrier, means for demodulating the received carrier to obtain a received pseudo-random code signal, means for generating a replica pseudo-random code signal having a code sequence that is identical to a code sequence of said received pseudo-random code signal, and means for indicating when a predetermined condition of phase correlation occurs between said received pseudo-random code signal and replica pseudo-random code signal, the method comprising, when a momentary interruption of reception of said radio signal occurs, a step of successively varying the phase of said replica pseudo-random code signal until said correlation condition is indicated, and setting the phase of said replica pseudo-random code signal at the phase value for which the correlation condition occurs, then repetitively executing at periodic intervals a phase derivation operation to obtain a current value of phase of said received pseudo-random code signal, the phase derivation operation including steps of:

deriving an amount of change of phase ($d(n)$) of the received pseudo-random code signal that has occurred since execution of an immediately preceding phase derivation operation, based on an amount of change of frequency of said received carrier, and storing that amount of phase change in a memory, computing a total amount of cumulative change of phase of said received pseudo-random code signal that has occurred since said correlation condition was indicated, based on a change in frequency of said received carrier, and setting the phase of said replica pseudo-random code signal to a value that is the sum of said initial phase value ($t_1$) and said total amount of phase change ($\Delta\tau(n)$);

measuring an amount of phase difference ($D_n$) between said received pseudo-random code signal and replica pseudo-random code signal;

calculating an average value of a cumulative total of successively derived ones of said amount of phase difference, respectively obtained since said initial value of phase was measured; and calculating the sum of said average value, said initial value of phase ($t_1$) and said total amount of phase change ($\Delta\tau(n)$), to obtain said current value of phase ($t_n$) of said received pseudo-random code signal;

the method further comprising a step of judging when a predetermined number of repetitions of said phase derivation operation has been executed, and when that predetermined number is reached, using said stored values of amount of phase change ($d(n)$) in conjunction with a value or received pseudo-random code signal phase that is derived when said predetermined number of repetitions is reached, to derive recalculated values ($t'_n$) for each of the values of received pseudo-random code signal phase ($t_n$) previously derived up to said predetermined number, then a step of setting a phase value derived when said predetermined number was reached, as an initial phase value of a negative feedback type of code tracking loop, and thereafter executing phase tracking of said received pseudo-random code signal by said code tracking loop to thereby obtain successive values of phase of said received pseudo-random code signal.

5. The method according to claim 3, wherein each of said recalculated phase values is obtained by adding a stored value of phase change amount ($d(n)$) to the difference between a value of received pseudo-random code signal phase ($t_{500}$) obtained in a final one of said repetitions of the phase derivation operation and a value of cumulative phase change ($\Delta\tau(500)$) obtained in said final phase derivation operation.

* * * * *